(12) United States Patent
Max et al.

(10) Patent No.: US 6,577,404 B2
(45) Date of Patent: Jun. 10, 2003

(54) ARRANGEMENT AND METHOD FOR MEASURING SURFACE IRREGULARITIES

(75) Inventors: Erland Max, Vastra Frolunda (SE); Peter Larsson, Vastra Frolunda (SE)

(73) Assignee: Volvo Personvagnar AB, Göteborg (SE)

( * ) Notice: Subject to any disclaimer, the term of this patent is extended or adjusted under 35 U.S.C. 154(b) by 19 days.

(21) Appl. No.: 09/682,712

(22) Filed: Oct. 9, 2001

(65) Prior Publication Data

US 2002/0093664 A1 Jul. 18, 2002

Related U.S. Application Data

(63) Continuation of application No. PCT/SE01/00235, filed on Feb. 8, 2001.

(51) Int. Cl.[7] .............................................. G01B 11/30
(52) U.S. Cl. ...................................................... 356/601
(58) Field of Search ................................. 356/600, 603, 356/604, 446

(56) References Cited

U.S. PATENT DOCUMENTS

| | | | |
|---|---|---|---|
| 4,212,073 A | * | 7/1980 | Balasubramanian ........ 356/604 |
| 4,449,818 A | * | 5/1984 | Yamaguchi et al. ........ 356/600 |
| 4,677,473 A | | 6/1987 | Okamoto et al. |
| 4,792,696 A | | 12/1988 | Kender et al. |
| 6,177,682 B1 | * | 1/2001 | Bartulovic et al. ...... 356/237.4 |

FOREIGN PATENT DOCUMENTS

| | | |
|---|---|---|
| DE | 19749435 A1 | 5/1999 |
| EP | 0955538 A1 | 11/1999 |
| JP | 4279848 A | 5/2001 |
| SE | 508822 | 11/1998 |
| SE | 511985 | 1/2000 |
| WO | WO 9836240 A1 | 8/1998 |
| WO | WO 0045125 A1 | 8/2000 |

* cited by examiner

Primary Examiner—Richard A. Rosenberger

(57) ABSTRACT

An arrangement and method for measuring surface irregularities of an object comprising at least one source of light arranged to illuminate the object from at least two different positions at a small angle of incidence towards the object, a camera arranged to measure the shadow formation generated by the illumination of the surface microstructure, and an evaluator for determining the surface microstructure from the generated shadow formation by means of signal processing of an input signal from the camera.

8 Claims, 2 Drawing Sheets

ARRANGEMENT AND METHOD FOR MEASURING SURFACE IRREGULARITIES

CROSS REFERENCE TO RELATED APPLICATIONS

The present application is a continuation of International Application No. PCT/SE01/00235, filed Feb. 8, 2001, which claims priority to Swedish Application No. 0000418-4, filed Feb. 9, 2000.

BACKGROUND OF INVENTION

1. Technical Field

The present invention relates to a method and arrangement for measuring surface irregularities of an object. More specifically, the invention relates to a method and arrangement for measuring surface irregularities of an object by utilizing strobe lighting and photometric stereo.

2. Background Information

A method for topography measurement on flat objects by means of directional illumination is previously known from "Optronik nyheter—TopografimAtning med strykande belysning", June 1999.

In those cases where the object to be measured is not flat, but instead exhibits a three-dimensional geometry, topography measurement cannot be applied by means of direct directional illumination.

SUMMARY OF INVENTION

The present invention provides an arrangement and method for measuring surface irregularities of an object where the object is illuminated by a source of light from a first position at a small angle of incidence. In this manner, measurement of an object exhibiting a curved, three-dimensional geometry is made possible.

This object is achieved by means of an arrangement comprising a pattern projector that generates a pattern matrix on an object and an evaluator arranged to measure the shape of the object based on the projection of the pattern matrix on the object. The evaluator is able to utilize information about the shape of the object calculated from the projection of the pattern matrix when determining the surface microstructure of the object.

The object is further achieved by means of a method comprising projecting a pattern matrix on an object by means of a pattern projector, measuring the shape of the object by an evaluator based on the projection of the pattern matrix on the object, and determining the surface microstructure from information about the projection of the pattern matrix on the object and shadow formations.

By generating a pattern matrix by means of a pattern projector, information about the shape and location of the object in relation to the pattern projector and camera is created. A useful pattern for this application is a gridiron pattern which is projected on the object. The projection of the pattern on the object describes the surface and position of the object, wherein the size of the squares can be utilized for determining the distance from the projector, and the deviation from linearity determines the shape of the object. When the shape and position of the object are known, the evaluating means determines the surface micro structure of the object.

BRIEF DESCRIPTION OF DRAWING

In the following, the invention will be described in detail with reference to attached figures in the drawings, where FIG. 1 provides an simple illustration of the function of a strobe lighting profilometer according to the present invention.

DETAILED DESCRIPTION

Figure 1:
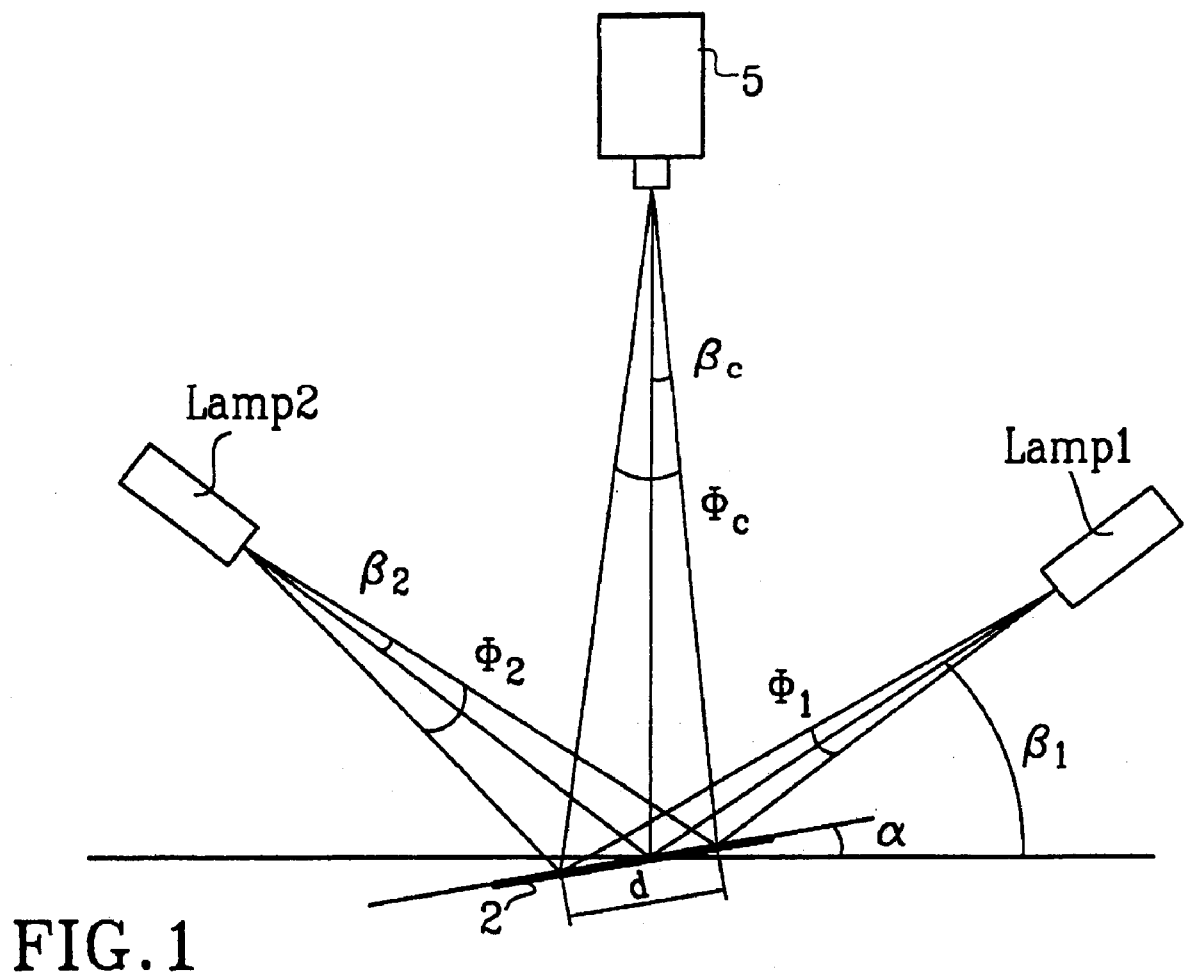

FIG. 1 shows a simple method which has been tested within this work. Surface irregularities are shadowed differently, when the surface is illuminated at two different angles by means of two concentrated sources of light. By means of collecting images at these two lighting angles, information about the surface profile can be obtained. The question at issue was if this simple method provides measurement vales which are sufficiently reliable.

The geometry of an arbitrary image point (x, y) is shown in FIG. 1. The pixel of the camera records the angle $\phi_c$ and "sees" the distance din the x-direction of the test surface. It can be demonstrated that the lighting effect $P_i$ (x,y) incident to the camera 5 from the image point (x, y) of the surface, with lighting from lamp number i(i=1, 2), is:

$$P_i(x, y) = \Phi_c^2 \cdot l_c^2 \cdot \Omega_c \cdot \frac{I_i(x, y)}{l_i^2(x, y)} \cdot \frac{R_i(x, y)}{\Omega_i(x, y)} \cdot \frac{\sin(\beta_i(x, y) - \alpha(x, y))}{\sin(\beta_c(x, y) - \alpha(x, y))} \quad [W] \quad (1)$$

where $\phi_c$ [rad] is the angle which a camera-pixel records, $l_c$ [m] is the distance between the camera and the test surface, $\Omega_c$ [srad] is the solid recording-angle of the camera, $l_i$ [W/srad] is the light intensity from lamp number i to the image point (x,y)

$l_i$ [m] is the distance between lamp number l and the image point (x,y)

$R_i$ [–] is the reflectance of the surface in the point (x,y)

$\Omega_i$ [srad] is the solid scattering-angle of the surface in the point (x,y) towards the camera with lighting from lamp number i, $\beta_i$ [rad] is the angle from the image point (x,y) to lamp number i, $\beta_c$ [rad] is the angle from the image point (x,y) to the camera, $\alpha$ [rad] is the deformation angle of the surface in the image point (x,y).

In order to obtain the angle a(x,y) for all image points (x,y) on the surface, it is convenient to create a normalized difference A of the two images $P_1$ (x,y) and $P_2$ (x,y) in accordance with $$A(x, y) = \frac{k_2(x, y) \cdot P_2(x, y) - k_1(x, y) \cdot P_1(x, y)}{k_2(x, y) \cdot P_2(x, y) + k_1(x, y) \cdot P_1(x, y)} \quad (2)$$

where $$k_i(x, y) = \frac{l_i^2(x, y)}{I_i(x, y)} \cdot \frac{\Omega_i(x, y)}{R_i(x, y)}, \quad i = 1, 2 \quad (3)$$

$P_i$ (x,y) are measured, $l_i$ (x,y) are known geometrical quantities, $l_i$ (x,y) are known from calibration, $$\frac{\Omega_i(x, y)}{R_i(x, y)}$$

in principle is different for different angles and directions.

As a result of the symmetry of the arrangement (FIG. 1), the ratio for i=1 can be expected to become rather similar to the ratio for 1=2, but this must be investigated further. A completely diffuse surface gives the ratio=π/reflectance.

If $$\frac{\Omega_1(x, y)}{R_1(x, y)} = \frac{\Omega_2(x, y)}{R_2(x, y)}$$

it results in $$A(x, y) = \frac{\sin(\beta_2(x, y) - \alpha(x, y)) - \sin(\beta_1(x, y) - \alpha(x, y))}{\sin(\beta_2(x, y) - \alpha(x, y)) + \sin(\beta_1(x, y) - \alpha(x, y))} \quad (4)$$

Since the angles $\beta_1$ and $\beta_2$ are known geometrical quantities, the deformation angle a(x,y) of the surface can be calculated from the measured images $P_1$ (x,y) and $P_2$ (x,y) by means of equations 2 4.

If $\beta_1$ (x,y)≈π(x,y)~/3, and a (x, y)<<1, a (x, y) can be approximated as a(x,y)≈tan (β)·A(x,y)

If further $k_1$ (x,y)≈$k_2$ (x,y), it results in $$\alpha(x, y) \approx \tan(\beta) \cdot \frac{P_2(x, y) - P_1(x, y)}{P_2(x, y) + P_1(x, y)} \quad (6)$$

Figure 2:
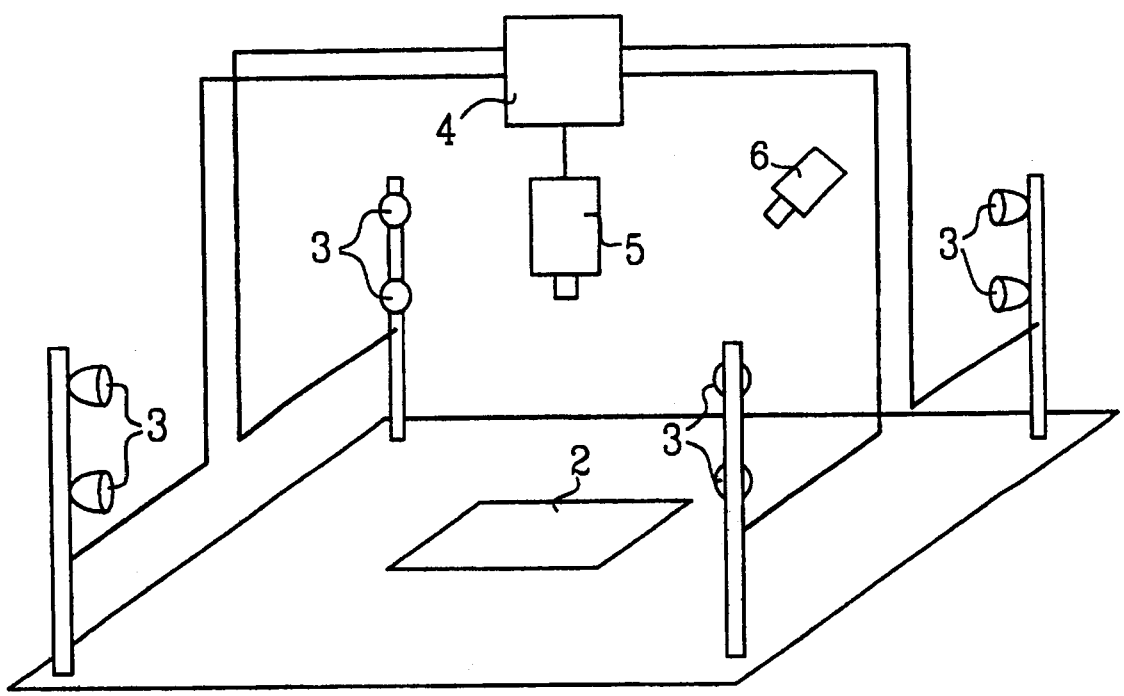
FIG. 2 illustrates one embodiment according to the present invention.

FIG. 2 shows one embodiment of an arrangement 1 for measuring surface irregularities at an object 2 according to the present invention. The arrangement 1 comprises a light source 3 arranged to illuminate the object from at least two different positions at a small angle of incidence towards the object. In the illustrated embodiment, eight (8) flash bulbs are mounted such that the flash bulbs form the corners of a rectilinear block. However, this is merely illustrative of one embodiment for placing the light source.

Through this design, simplified calculation routines are obtained for an evaluator or evaluating means 4, which is arranged to calculate the surface microstructure of the object 2 from input data provided by a camera 5. The camera 5 is arranged to measure the surface microstructure from the shadow formation generated by the flash bulbs 3. The evaluating means 4 determines the surface microstructure from the shadow formation generated by means of signal processing an input signal from the camera 5, in accordance with the principle which has been explained with reference to FIG. 1.

Additionally, the arrangement may comprise a pattern projector 6 for generating a pattern matrix on the object 2. The pattern matrix can preferably be constituted by a gridiron pattern which is projected on the object. The projection of the pattern on the object describes the surface and the position of the object, wherein the size of the squares of the grid can be utilized for, e.g., determining the distance from the projector. The deviation from linearity determines the shape of the object.

The evaluator or evaluating means 4 is arranged to measure the shape of the object 2 from the projection of the pattern matrix on the object 2. Further, the evaluating means 4 is arranged to utilize information about the shape of the object 2, calculated from the projection of the pattern matrix, when determining the surface micro-structure of the object. When the shape and position of the object 2 are known, the evaluating means 4 determines the surface microstructure of the object.

By performing at least two lightings of the object 2, the system can compensate 5 for variations in the reflectance of the object. An angle-dependent scattering pattern can be compensated for if additional lightings are performed. In order to compensate for the angle-dependent scattering, it is advantageous to mount the lamps at different heights above the object. Initially, however, a parameter model for the scattering variation has to be generated. Thereafter, the value of the parameters can be calculated.

In order to achieve a good measurement result, the angle of the incident ray should not be made too large. For this reason, when objects having a non-flat geometry are to be measured, it is necessary to utilize an array of light sources.

When performing measurements by means of the arrangement, a calibration step is performed whenever applicable. This step includes loading data concerning where and how relative positions between camera and lamps is controlled into the evaluating means 4, calibrating the lamps with regard to light intensity and direction, calibrating the camera in each pixel, and calibrating the pattern projector against a flat surface.

The above-mentioned calibration step need not be performed for each measurement. However, it is of great importance in the result that the arrangement is correctly calibrated.

According to one embodiment of the invention, when the measurement is to be performed, the following steps are performed:

1) A background image is recorded.
2) One image from each lamp is recorded and the background image is subtracted from this.
3) The shape of the object is measured by means of the pattern projector.
4) The angles of inclination α in x- and y-direction of the surface are calculated for each image point from normalized differences in accordance with what has been described in connection with the above-explained principle
5) The angle-dependence of the light scattering is calculated for the obtained preliminary α-values.
6) The α-values are adjusted so that the angle-dependence of the light scattering is optimized.
7) The height profile is integrated from the α-values and added to the shape of the object.
8) The result is presented.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. An arrangement for measuring surface irregularities of an object, the arrangement comprising:
   at least one source of light arranged to illuminate the object from at least two different positions at a small angle of incidence towards the object,
   a camera arranged to measure the shadow formation generated by the illumination of the surface microstructure, and an evaluator for determining the surface microstructure from the generated shadow formation by means of signal processing of an input signal from the camera, and a pattern projector for generating a pattern matrix on the object, wherein the evaluator is arranged to measure the shape of the object from the projection of the pattern matrix on the object, and wherein the evaluator is further arranged to utilize information about the shape of the object calculated from the projection of the pattern matrix when determining the surface microstructure of the object.

2. The arrangement according to claim 1, wherein the at least one source of light is arranged to illuminate the object from a plurality of different positions at different angular positions in relation to the object, wherein the camera is arranged to measure the shadow formation at said different angular positions, and wherein the evaluator is arranged to generate information about the reflectance of the object from the measured shadow formation.

3. The arrangement according to claim 1, wherein the at least one source of light is arranged to illuminate the object from a plurality of different positions at different angular positions in relation to the object, the camera is arranged to measure the shadow formation at said different angular positions, and the evaluator is arranged to generate information about angle-dependence of the light-scattering of the object from said shadow formation.

4. The arrangement according to claim 2, wherein the at least one source of light is arranged to illuminate the object from at least three different positions at different angular positions in pairs in relation to the object, wherein compensation for angle-dependence and reflectance is enabled when determining the surface microstructure of the object.

5. The arrangement according to claim 1, wherein said at least one source of light is arranged to illuminate the object from a plurality of different positions at different angular positions, wherein illumination at a small angle of incidence towards the object is accomplished also for an object having a non-flat geometry.

6. The arrangement according to claim 1, wherein said at least one source of light is constituted of concentrated arrays of flash bulbs in pairs placed at different angles in relation to the object.

7. The arrangement according to claim 1, wherein the at least one source of light is comprised of an orthogonal array 20 of concentrated flash bulbs in pairs in x-direction, y-direction and z-direction.

8. A method for measuring surface irregularities of an object, the method comprising the steps of:

illuminating the object by a source of light from a first position at a small angle of incidence, generating a first shadow formation from the surface micro-structure of the object, measuring the first shadow formation generated by a light source from a first position, storing information about the first shadow formation in memory, illuminating the object by a source of light from a second position at a small angle of incidence, generating a second shadow formation from the surface micro-structure of the object, measuring the second shadow formation generated by a source of light from a second position, storing information about the second shadow formation in memory, projecting a pattern matrix on the object by means of a pattern projector, and measuring the shape of the object from the projection of the pattern matrix on the object by an evaluator, wherein the evaluator determines the surface microstructure from information about the projection of the pattern matrix on the object and shadow formations.

* * * * *